May 20, 1930.  R. G. McKAY  1,758,957
VEHICLE
Filed Aug. 24, 1928
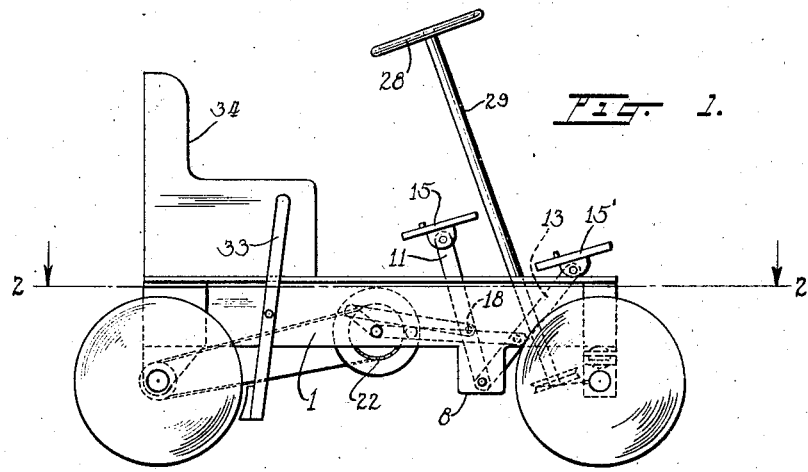
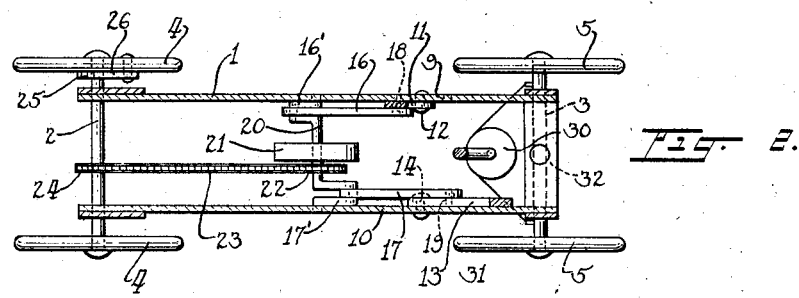
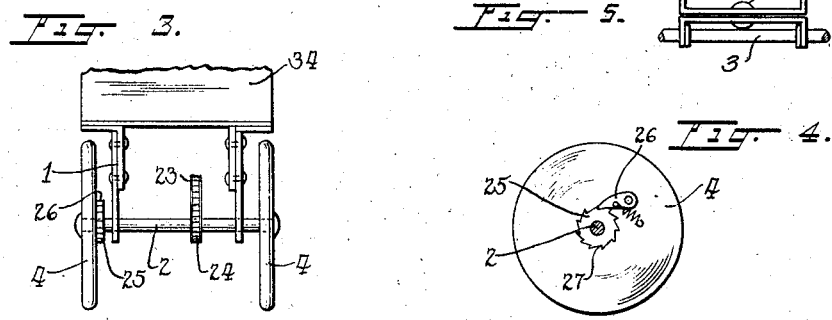
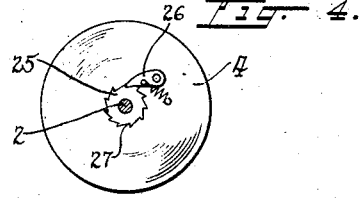
INVENTOR
R. G. McKay
BY
ATTORNEYS Patented May 20, 1930

1,758,957

UNITED STATES PATENT OFFICE

ROBERT GASAWAY McKAY, OF INDIANA HARBOR, INDIANA

VEHICLE

Application filed August 24, 1928. Serial No. 301,812.

My invention relates to improvements in vehicles, and it consists in the combinations, constructions, and arrangements herein described and claimed.

An object of my invention is to provide a vehicle having means whereby the smooth operation of the vehicle will be insured during all the various stages of operation.

A further object is to provide a vehicle having means whereby the momentum created during the operation of the vehicle is utilized as a partial propellant for continuing the operation of the vehicle.

A further object is to provide a vehicle having means whereby the vehicle may turn a corner at a high rate of speed with a minimum risk of overturning.

A further object is to provide a vehicle, simple in construction, easy to operate, and having a maximum of safety to the operator.

Other objects and advantages will appear in the following specification, and the novel features of the invention will be particularly pointed out in the appended claims.

My invention is illustrated in the accompanying drawings, forming part of this application, in which Figure 1 is a side elevation of my device, Figure 2 is a sectional top plan view of my device taken substantially along the line 2—2 of Figure 1, Figure 3 is an end elevation of my device, Figure 4 is a detail view of a portion of my device, and Figure 5 is a fragmentary view showing a part of the axle assembly.

In carrying out my invention, I make use of a vehicle frame 1 mounted upon a rear axle 2 and a front axle 3. Rear wheels 4 are rotatably mounted upon the rear axle 2, and wheels 5 are mounted upon the front axle 3.

Downwardly projecting portions 8 are provided on the sides 9 and 10 of the frame 1 at any desirable point between the front and rear axles 2 and 3. The portions 8 may be integral with the frame 1 or rigidly secured thereto by any means not shown.

A lever 11 has one end pivotally mounted upon the projections 8 at the point 12 on the side 9 of the frame 1, and one end of a similar lever 13 is similarly disposed on the projection 8 at the point 14 on the side 10 of the frame 1. Pedals 15 and 15' are pivotally mounted on the opposite ends of the levers 11 and 13, respectively. Each of the actuating arms 16 and 17 has one end pivotally mounted upon the levers 11 and 13, respectively, at the points 18 and 19 and its other end rotatably secured to the crank arms 16' and 17', respectively, of the crank shaft 20.

A flywheel 21 and a sprocket wheel 22 are rigidly mounted upon the crank shaft 20. A sprocket chain 23 is mounted upon the sprocket wheel 22 and extends around another sprocket wheel 24 which is rigidly mounted upon the rear axle 2. A ratchet wheel 25 is rigidly mounted upon the rear axle 2 adjacent one of the rear wheels 4. A ratchet arm 26 has one end pivotally mounted upon the rear wheel 4 and the other end extending into the ratchet 27 of the ratchet wheel 25.

A steering wheel 28 is rigidly secured to one end of a rod 29. A wheel 30 is fixedly attached to the opposite end of the rod 29. The wheel 30 is adapted to receive a rope or wire 31 which is connected at its ends at spaced-apart positions to the front axle 3. The front axle 3 is pivotally secured to the frame 1 at the point 32.

Any type of brake 33 may be attached to the frame 1. A seat 34 is mounted upon the vehicle frame 1.

From the foregoing description of the various parts of the device, the operation thereof may be readily understood. When the operator presses his foot against the pedal 15, the lever 11 is moved forwardly about its pivot. This movement pulls the arm 16 forwardly, and the arm 16 in turn pulls on the crank arm 16', thereby rotating the crank shaft 20. As the arm 16 moves forwardly, the arm 17 moves in the opposite direction until it occupies a position similar to that originally occupied by the lever 11, at which time the lever 13 has been forced to its extreme forward position.

The operator then presses his other foot against the pedal 15 and the lever 13 is moved forwardly in the same manner as described for the lever 11. By the alternate forcing forwardly of the lever 11 and the lever 13, the crank shaft 20 is caused to rotate. This rotation is transmitted to the rear axle 2 by means of the sprocket chain 23. The rotating rear axle 2 inturn rotates the rear wheels 4.

The flywheel 21 adds momentum to the speed of the vehicle by utilizing the past energy expended in rotating the crank shaft 20. By means of this flywheel 21, the continued operation of the vehicle is carried on with a minimum of effort expended by the operator. The flywheel 21 also gives smoothness in the operation of the vehicle by eliminating the jerks which occur in other vehicles due to the sudden pressing and stamping of the feet upon the pedals 15 and 15'.

The eccentric arms 16' and 17' on the crank shaft 20 are disposed at slightly less or more than 180° from each other to prevent the dead centering of the arms 16 and 17. One of the rear wheels 4 is rigidly mounted upon the rear axle 2, and the other rear wheel 4 is rotatably mounted upon the axle 2.

The ratchet wheel 25 is so designed that it will engage the ratchet arm 26 and drive the wheel 4 adjacent thereto when power is applied to the rear axle 2, provided the adjacent wheel is not turning faster than the axle 2. If the wheel is turning faster than the axle, such being the case when the wheel is on the outside during the turning of a corner, then the ratchet arm 26 will slide over the ratchets 27, permitting the wheel to rotate freely. This is of a decided advantage when turning a corner at a high rate of speed.

When a vehicle turns a corner, the wheels on the outside of the arc of the turn have farther to travel than those on the inside of the arc. When the rear wheels are rigidly mounted to the rear axle, as is the case in the average vehicle, they both rotate at the same rate of speed. The outside wheel must rotate faster than the inside wheel, but is prevented from so doing by being rigidly mounted upon the same axle. Thus it acts as a brake to a certain extent because it is prevented from rotating freely, and it is this braking effect that often causes the overturning of vehicles.

Since the outside rear wheel in this vehicle is not prohibited from turning faster than the axle on which it is rotatably mounted, the danger of the vehicle overturning during operation will be eliminated. This provides the utmost safety to the operator.

I claim:

1. A device of the type described comprising a frame, an axle rotatably carried by said frame, wheels mounted upon said axle, a flywheel rotatably carried by said frame, means for operatively connecting said flywheel with said axle, pedal levers pivotally mounted upon said frame, and means connecting said levers to said flywheel at spaced-apart points, whereby said levers may be moved in opposite directions for rotating said flywheel for rotating said axle and said wheels.

2. A device of the type described comprising a frame, an axle rotatably carried by said frame, wheels mounted upon said axle, a flywheel rotatably carried by said frame, means for operatively connecting said flywheel with said axle, pedal levers pivotally mounted upon said frame, means connecting said levers to said flywheel at spaced-apart points, whereby said levers may be moved in opposite directions for rotating said flywheel for rotating said axle and said wheels, and means whereby one of said wheels may be rotated at a faster rate of speed than the other of said wheels.

3. A device of the type described comprising a frame, an axle rotatably carried by said frame, wheels mounted upon said axle, a flywheel rotatably carried by said frame, means for operatively connecting said flywheel with said axle, pedal levers pivotally mounted upon said frame, means connecting said levers to said flywheel at spaced-apart points, whereby said levers may be moved in opposite directions for rotating said flywheel for rotating said axle and said wheels, means whereby one of said wheels may be rotated at a faster rate of speed than the other of said wheels, guide wheels rotatably carried by said frame, and means for steering said guide wheels.

Signed at East Chicago, in the county of Lake and State of Indiana this 18th day of August, 1928.

ROBERT GASAWAY McKAY.